Dec. 23, 1930.     M. HARRISON     1,786,300
MACHINE OR APPARATUS FOR TREATING FOODS OR THE LIKE
Filed Feb. 8, 1928
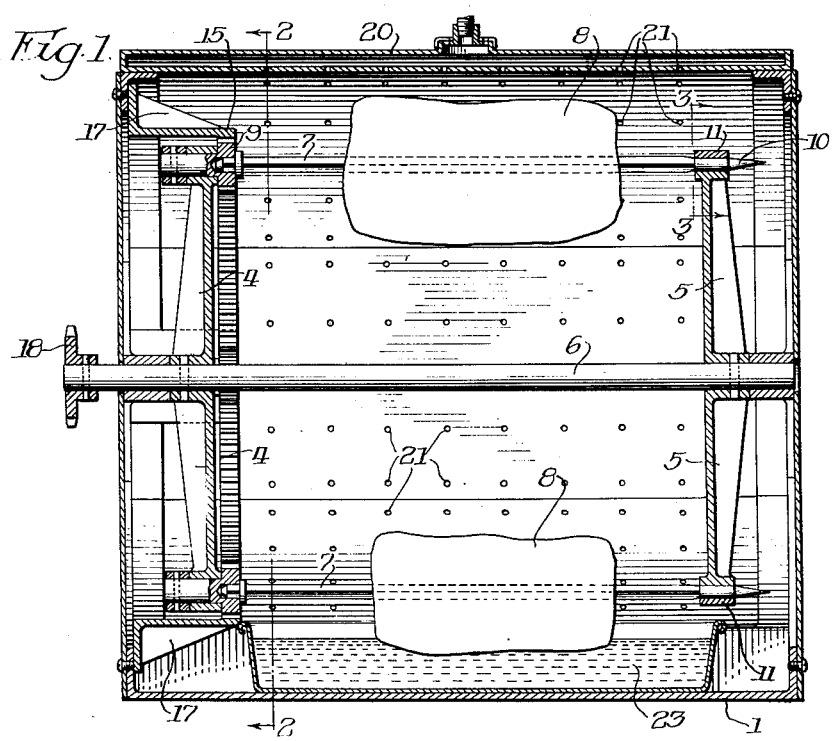
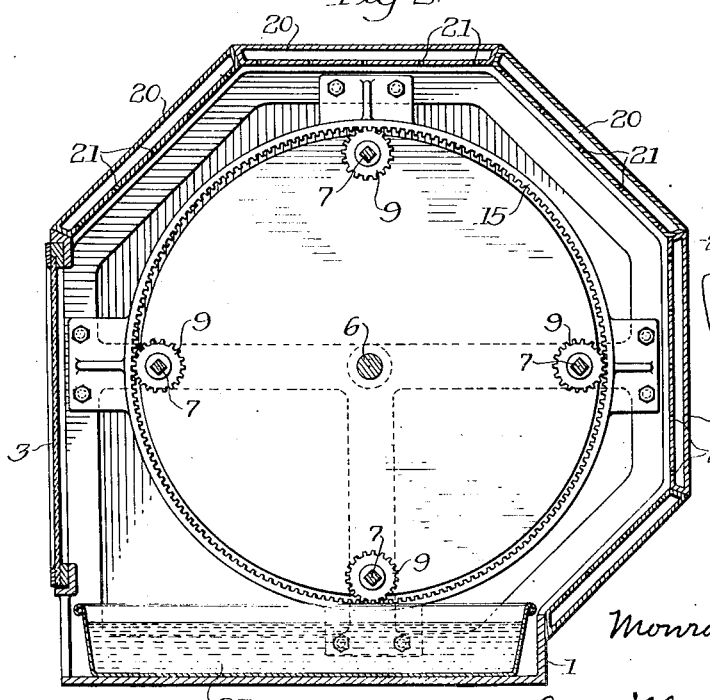
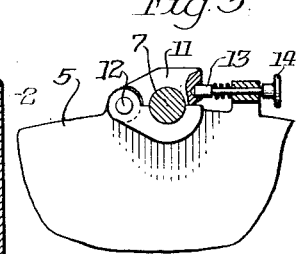
Inventor
Monroe Harrison,
By A. Miller Belfield, Atty

Patented Dec. 23, 1930

1,786,300

UNITED STATES PATENT OFFICE

MONROE HARRISON, OF CHICAGO, ILLINOIS

MACHINE OR APPARATUS FOR TREATING FOODS OR THE LIKE

Application filed February 8, 1928. Serial No. 252,892.

My invention relates to machines or apparatus for treating foods, or the like.

One of the objects of the invention is to provide a simple, practical and advantageous machine or apparatus of the class specified.

Another object of the invention is to provide a machine which can advantageously treat food by roasting or similar process involving the application of heat.

Another object of the invention is to provide a machine which may so treat the food that it may be subjected to other operations, such for example, as a moistening or wetting operation.

Another object of the invention is to provide a machine by which the food or other article may be heated so as to roast or otherwise treat it and may also be wet or moistened at times so as to prevent undue heating and drying and secure advantageous roasting or cooking effects.

Another object of the invention is to provide a machine by which the food or other article may be heated so as to cook or roast, or otherwise treat it and by which it may also be dipped at intervals in its own gravy or other suitable liquid to secure advantageous cooking effects.

In the accompanying drawings:

Fig. 1 is a vertical section of a machine or apparatus embodying my invention;

Figs. 2 and 3 are cross-sections taken on lines 2—2 and 3—3 in Fig. 1;

Referring to the drawings, I show a machine which is well adapted to carry out the invention, but it may be modified or changed in various respects without departing from the invention. In this machine a base member 1 is provided and upon it is mounted a frame structure 2 forming a hollow casing or housing. This structure 2 may be polygonal in form, as shown in Fig. 2 is preferably provided with a window 3 permitting the interior of the device to be seen from the outside.

Within the structure 2 is a food carrying element, as for example, a rotary frame conveniently consisting of disks or wheels 4, 4 and 5, 5 mounted on roller shaft 6. This rotary frame comprises a rotatable carrier for the articles to be treated. In the arrangement shown I preferably provide cross members 7, 7 for supporting such articles, which latter are shown as 8, 8 and may consist of pieces of meat or other food. These devices 7, 7, may be spindles or spits, so-called, adapted to pass through the food articles to hold them in place. To such end means are provided for allowing the food articles to be slipped on and off from the spits or spindles, as for example, by mounting one end of a spindle 7 loosely in a socket device 9 which is carried by the disk 4 and providing the other end of the spindle 7 with a pin 10 which is fitted in a bearing having a swinging member 11 pivoted at 12 and held normally in position by a spring controlled plunger 13 having a hand button 14. In this way the spindle 7 may be swung outwardly so as to permit the food article 8 to be slipped on or off from it and then its pointed end 10 may be fitted in the bearing 11 and held in place as long as it is desired to have the food article upon it.

The member 9 loosely holding one end of the spindle 7 may be a stud shaft having a toothed pinion integral therewith or attached thereon having teeth adapted to mesh with an annular rack 15 held firmly and stationarily in the machine, as by supporting members 17, 17. Thus, as the shaft 6 is turned, the spits 7, 7 of which there may be any desired number, four (4) being shown, will move in circular paths and will be turned by the stud shafts having their pinions 9 meshing with rack 15. A suitable driving wheel or gear 18 may be applied to the outer end of shaft 6 so as to permit application of power to shaft 6 and the rotary article carrying frame which it supports.

I preferably provide heating elements by which the food articles 8 on the rotary carrier may be heated. As a convenient arrangement the walls of the member 2 are preferably made hollow and in the form of a series of chambers 20, 20 adapted to contain gas or other suitable fuel, apertures or gas jets 21 being shown on the inner walls through which the gas may escape to provide heating elements. Thus, as the rotary carrier is turned, the food articles 8 mounted on the spindle 7 will be brought adjacent to these heating elements and being constantly rotated will be heated properly and equally on all sides.

I further preferably provide an arrangement by which the articles under treatment may be dipped or submerged in a suitable liquid, as for example, the gravy of the article, etc. For such purpose I show a pan or receptacle 23 mounted in the base member 1 in such position that the articles 8 will be dipped or partially submerged in liquid contained by said pan 23. By this arrangement the food articles may be kept from overheating or burning, or drying and may also be given the juicy and desirable effects secured by cooking or roasting in gravy or other liquid.

Thus the machine provides for the advantageous treatment of food articles, permitting them to be evenly heated by an extensive heating element, or it may be considered a series of closely associated heating elements, so that heating takes place through a large part of the movement of the articles. Also, the machine permits the advantageous cooking or roasting to prevent drying and secure the juicy effects, and also the interior of the machine is visible from the outside to see that the process is taking place properly.

It will be understood that changes and modifications may be made without departing from the spirit of the invention.

What I claim is:

1. In a device of the class described, the combination with a casing having a stationary internal toothed annular gear in one end thereof and heating elements along sides thereof, of a rotating shaft journaled centrally in the casing, two disks secured on said shaft at opposite ends thereof, stub shafts journaled in the periphery of one of the disks and having spur gear pinions thereon meshing with the annular gear, spits arranged parallel to each other and to the central rotating shaft, sockets in said spur pinions for one end of the spits, said spits extending to the other disk, and separable bearings for the other ends of the spits in the second mentioned disk.

2. In a device of the class described, the combination with a casing having heating elements along the circumferential sides thereof, a stationary internal toothed annular gear in one end of the casing, of a rotatable shaft journaled centrally in the casing, two disks secured on said shaft near the opposite ends thereof, for rotating therewith, stub shafts journaled in the periphery of one of the disks and having spur gear pinions thereon meshing with the annular gear, sockets in said pinions for one end of spits, said spits being adapted to extend to the other disk, and separable bearings for the adjacent ends of the spits in the said other disk, said separable bearings consisting of semi-circular members fixedly secured to the periphery of the disk and complementary semi-circular bearing members hinged to the first mentioned semi-circular bearing members, and spring pressed pins for locking the hinged bearings in place.

3. In a device of the class described, the combination with a casing having a stationary internal toothed annular gear in one end thereof and heating elements along the peripheral sides thereof, of a rotating shaft journaled centrally in the casing, two disks secured on said shaft near the opposite ends thereof, stub shafts journaled in the periphery of one of the disks and having spur gear pinions thereon meshing with the annular gear, sockets in said spur pinions for one end of the spits, said spits being adapted to extend between the disks, and separable bearings for the ends of the spits in the other disk, said spits being square in cross section except toward the ends cooperating with the separable bearings where they are circular in cross section and the ends beyond the circular portions being pointed.

4. In a device of the class described, the combination with a generally cylindrical casing, one vertical side being transparent, the flat bottom being adapted to receive a basting pan, and the rest of the sides consisting of shallow rectangular chambers adapted to receive gas and having gas burner perforations in their inner walls, of a rotating horizontal shaft journaled centrally of the casing, two disks secured on said shaft near the opposite ends thereof, longitudinally extending spits journaled in the peripheries of the two disks, and means for rotating the shaft and the spits.

5. In a device of the class described, the combination with a generally cylindrical casing, one vertical side of which is transparent, the flat bottom being adapted to receive a basting pan, and the rest of the sides consisting of shallow rectangular chambers adapted to receive gas and having gas burner perforations in their inner walls, of a stationary internally toothed annular gear in one end of said casing, a rotating shaft journaled centrally in the casing, two disks secured on said shaft near the opposite ends thereof, stub shafts journaled in the periphery of one of the disks and having spur gear pinions thereon meshing with the annular gear, sockets in said spur pinions for one end of the spits, said spits adapted to extend between the disks, and separable bearings for the ends of the spits in the other disk.

6. In a device of the class described, the combination with a generally cylindrical casing, one vertical side being transparent, the flat bottom being adapted to receive a basting pan, and the rest of the sides consisting of shallow rectangular chambers adapted to receive gas and having gas burner perforations in their inner walls, there being an aperture beneath the transparent side through which the basting pan may be inserted, of a rotating horizontal shaft journaled centrally of the casing, two disks secured on said shaft near the opposite ends thereof, longitudinally extending spits journaled in the peripheries of the two disks, and means for rotating the shaft and the spits.

7. In a device of the class described, the combination with a generally cylindrical casing, one vertical side being transparent, the flat bottom being adapted to receive a basting pan, and the rest of the sides consisting of shallow rectangular chambers adapted to receive gas and having gas burner perforations in their inner walls, there being an aperture beneath the transparent side through which the basting pan may be inserted, of a rotating shaft journaled centrally in the casing, two disks secured to said shaft near the opposite ends thereof, stub shafts journaled in the periphery of one of the disks and having spur gear pinions thereon, a stationary internally toothed annular gear in one end thereof with which said spur gear pinions mesh, sockets in said spur pinions for one end of spits, said spits adapted to extend between the disks and being square in cross section, and separable bearings for the ends of the spits in the other disk, said bearings consisting of semi-circular members fixedly secured to the periphery of the disk and complementary semi-circular bearing members hinged to the first mentioned bearing members, and spring pressed pins for locking the hinged bearings in place, said spits being pointed beyond the separable bearings.

In witness whereof, I hereunto subscribe my name this 17th day of January A. D., 1928.

MONROE HARRISON.